United States Patent [19]
Walker et al.

[11] Patent Number: 5,973,995
[45] Date of Patent: *Oct. 26, 1999

[54] METHOD OF AND APPARATUS FOR MARINE SEISMIC SURVEYING

[75] Inventors: Robin Charles Walker, West Sussex, United Kingdom; Olav Lindtjoern, Hosle, Norway

[73] Assignee: Geco A.S., Stavanger, Norway

[ * ] Notice: This patent issued on a continued prosecution application filed under 37 CFR 1.53(d), and is subject to the twenty year patent term provisions of 35 U.S.C. 154(a)(2).

[21] Appl. No.: 08/836,938
[22] PCT Filed: Dec. 6, 1995
[86] PCT No.: PCT/GB95/02836
§ 371 Date: Aug. 4, 1997
§ 102(e) Date: Aug. 4, 1997
[87] PCT Pub. No.: WO96/18117
PCT Pub. Date: Jun. 13, 1996

[30] Foreign Application Priority Data

Dec. 8, 1994 [GB] United Kingdom .................. 9424744

[51] Int. Cl.[6] .................. G01V 1/16; G01V 1/38
[52] U.S. Cl. .................. 367/20; 367/21; 367/56; 367/58
[58] Field of Search .................. 367/20, 21, 56, 367/58

[56] References Cited

U.S. PATENT DOCUMENTS

| | | | |
|---|---|---|---|
| 3,414,487 | 12/1968 | McLoad | 367/20 |
| 3,613,071 | 10/1971 | Quay | 367/21 |
| 3,744,021 | 7/1973 | Todd | 367/20 |
| 4,020,447 | 4/1977 | Michon et al. | 367/20 |
| 4,091,358 | 5/1978 | Bayhi | 367/20 |
| 4,497,045 | 1/1985 | Miller | 367/78 |
| 4,693,336 | 9/1987 | Newman | 181/111 |
| 4,726,315 | 2/1988 | Bell et al. | 367/15 |
| 4,798,156 | 1/1989 | Langeland et al. | 367/20 |
| 5,058,080 | 10/1991 | Seims et al. | 367/79 |
| 5,148,406 | 9/1992 | Brink et al. | 367/22 |

FOREIGN PATENT DOCUMENTS

| | | |
|---|---|---|
| 101282 | 2/1984 | European Pat. Off. . |
| 967589 | 8/1964 | United Kingdom . |
| 2233455 | 1/1991 | United Kingdom . |

*Primary Examiner*—Nelson Moskowitz
*Attorney, Agent, or Firm*—William B. Batzer

[57] ABSTRACT

The present invention enables both deep marine seismic surveys and site seismic surveys to be performed simultaneously. A survey vessel tows a first seismic array (6, 16, 20) for a deep survey and a second seismic array (6, 16, 20) for the site survey. The arrays are operationally distinct but may share common physical components.

20 Claims, 2 Drawing Sheets

METHOD OF AND APPARATUS FOR MARINE SEISMIC SURVEYING

The present invention relates to a method of and apparatus for marine seismic surveying.

There are two distinct surveying operations that are generally performed. The first is a relatively deep exploration of the geology of an area. This is referred to hereinafter as a "deep" survey. Current techniques allow this survey to be performed as a 3D survey. Thus a single pass of a survey vessel or vessels working together surveys a corridor of the sea floor rather than a line as in 2D surveying. FIG. 1 of the accompanying drawings is a schematic illustration of the streamer arrangement of a conventional 3D survey. A seismic survey vessel 2 tows a plurality of "long" streamers 4 and seismic sources 6. The streamers, each of which is typically at least 2 Km long, carry hydrophones along their length. The hydrophones are arranged into groups and the length of each group is known as a "group interval". The sources 6 typically comprise two or three sub arrays, each comprising six to ten airguns. The sources typically produce a peak pressure of 30–100 bar at one metre with a 8 to 70 Hz frequency range. Each source is fired in sequence and a shot is taken every 18 to 25 metres of boat travel.

After the raw seismic data have been acquired, the reflected signals (known as traces) received by each group of hydrophones from each actuation of a seismic energy source are processed to produce a subsurface image. The processing includes the steps of transforming (or "migrating") the signals to their actual sub-surface location. The traces may be corrected to account for the separation (also known as offset) between the source and the hydrophone or hydrophones. A first correction accounts for the fact that the velocity of sound within the earth tends to increase with depth as the earth layers become more compacted. The correction is derived empirically from the data itself and is known as normal moveout correction. To successfully make this correction, data from a large range of offsets are required. A further correction is made to account for the inclination (or dip) of the reflecting surfaces or interfaces within the earth. The area being surveyed may be notionally divided into an array of cells (or bins). All the traces which have been assigned to a bin are then summed (stacked) to obtain a single trace for each bin. The stacked trace has an improved signal to noise ratio compared to the individual traces as the signal tends to add constructively whereas the noise is generally incoherent and does not add constructively. A more detailed description of the data processing of traces can be found in GB 2347751.

The arrangement of sources and hydrophones defines the maximum resolution available. The bin size can be defined arbitrarily but in practice is normally a multiple of the smallest definable feature. On this basis, the smallest bin size is:

parallel to vessel movement—half the group interval, and
transverse to vessel movement—half of the transverse separation between each streamer divided by the number of energy sources used.

Thus a four streamer arrangement cooperating with three sources having a streamer separation of 150 m and a group interval of 12.5 m gives a bin size of 6.25 m "in line" with the travel of the survey vessel and 25 m cross-line (transverse).

The in-line and cross-line resolutions are different because it is relatively easy and inexpensive to divide the streamer into many short groups, but it is expensive and difficult to deploy more streamers.

The second type of marine seismic survey is a relatively shallow exploration of the geology of an area. This is referred to hereinafter as a "shallow" survey. A shallow survey may comprise a high resolution survey, an example of which is commonly known as a site survey (all such high resolution surveys are hereinafter collectively referred to as site surveys). Here it is required to derive a lot of information about a relatively thin portion of the earth adjacent and including the sea floor. The site survey is used to assess the risk to equipment and personnel that may be involved in drilling into a given region of the earth. Hazards include pockets of gas and an unstable sea floor.

Conventionally a site survey is performed in a 2D surveying mode using a specially constructed streamer having a reduced group interval of typically six to 10 metres and a modified seismic energy source, such as an airgun or a "sparker", for producing higher frequencies. The source typically produces a peak pressure of less than 15 bar at one metre with a bandwidth of 20 to more than 150 Hz. It is thus possible to provide a survey with greater resolution than is provided by a conventional deep survey. A region of the sea bed is subjected to a site survey after a possible drilling position has been identified from a conventional survey. If the site survey reveals reasons why a particular location is not suitable, there may be insufficient site survey coverage to identify an alternative site. Thus a further survey vessel may need to be deployed at a later date to survey a different area. GB 2 233 455, GB 2 125 550, GB 1 330 628 and GB 1 306 586 disclose two dimensional marine seismic surveying techniques which simultaneously survey deep and shallow targets using streamers or streamer regions of different sizes and/or different resolutions.

GB 967 589 discloses the use of a streamer having a region of reduced group interval to provide vertically enhanced resolution and a region of large group interval to obtain a large spread of hydrophones so that normal moveout correction can be applied to reveal multiple reflections.

U.S. Pat. No. 4,781,140 discloses a boom arrangement for deploying multiple sources and streamers laterally of a ship for three dimensional seismic surveying.

According to a first aspect of the present invention, there is provided a method of marine seismic surveying, comprising towing a first seismic array for deep three dimensional seismic surveying, towing a second seismic array for shallow three dimensional seismic surveying, and performing the deep surveying and the shallow surveying concurrently, wherein the lateral separation between streamers of the second seismic array is less than the lateral separation between streamers of the first seismic array.

It is thus possible to make a deep marine seismic survey in which the geology of the area surveyed is probed to a considerable depth concurrently with a shallow survey, such as a site survey in which a more detailed investigation of the geology within a few hundred metres of the sea bed is established, with greater lateral resolution.

Preferably the streamers of the first seismic array have a first group interval and the streamers of the second seismic array have a second group interval smaller than the first group interval. This enables the second array to achieve a greater longitudinal resolution than the first array.

Advantageously some or all of the streamers of the second array may be embodied within some or all of the streamers of the first array. Thus some or all of the streamers of the first array may have a first region therein having the first group interval and a second region therein having the second group interval. The second region may act as a streamer of the second array, whereas both the first and second regions may act as a streamer for the first array. Advantageously the second regions are located nearer to the seismic energy sources than the first regions. This has the advantage that the second regions are adjacent short streamers which may be deployed solely for the purpose of performing a site survey. The position of the second regions with respect to the survey vessel may also be less affected by wind, waves and tide. The control of streamer position also has an effect upon the resolution of the survey.

Preferably the streamers of the first array are physically longer than streamers which only belong to the second array. Typically the minimum length of streamers of the first array is approximately equal to the maximum depth that the survey is required to investigate.

Advantageously the first and second arrays further comprise respective seismic sources. The or each source of the second array may be arranged to produce a signal having a higher cut-off frequency than the or each source of the first array. Alternatively the seismic sources may be common to the first and second arrays.

According to a second aspect of the present invention, there is provided an apparatus for marine seismic surveying, comprising a first seismic array for deep three dimensional seismic surveying and a second seismic array for shallow three dimensional seismic surveying, the seismic arrays being arranged to perform the deep surveying and the shallow surveying concurrently, wherein the lateral separation between streamers of the second seismic array is less than the lateral separation between streamers of the first seismic array.

It is thus possible to provide a shallow survey of greater lateral resolution concurrently with a survey of the deeper geological features. This is of particular advantage since the analysis of the deeper survey may indicate the possibility of mineral resources such as oil or gas. Data from the shallow survey such as site survey data may then be examined to assess the hazards to drilling operations (such as pockets of gas or an unstable sea floor) for reaching those mineral resources.

The present invention will further be described, by way of example, with reference to the accompanying drawings, in which.

Figure 1:
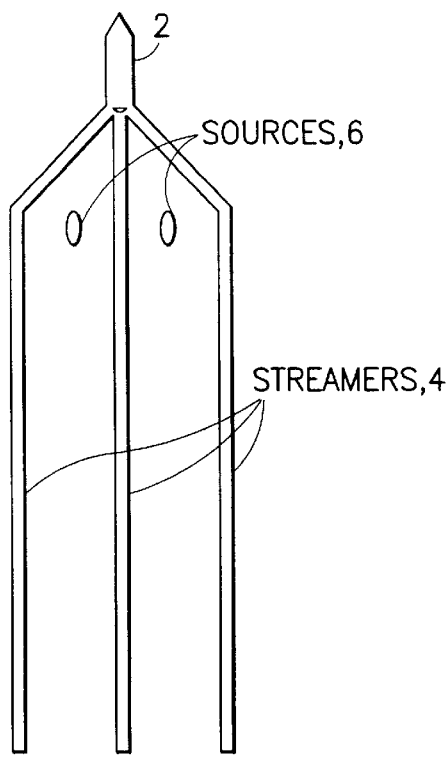
FIG. 1 is a schematic diagram showing the streamer positions in a conventional 3D marine seismic survey.
Figure 2:
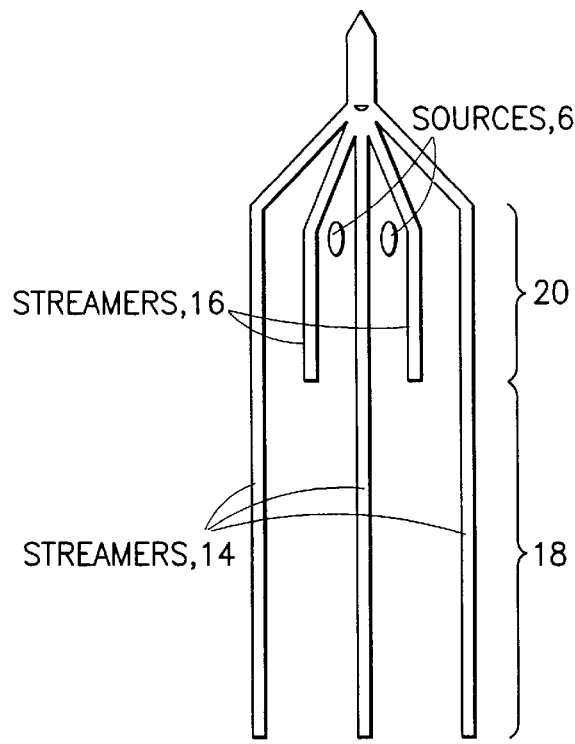
FIG. 2 is a schematic diagram of a survey arrangement constituting a first embodiment of the present invention.

The seismic survey arrangement shown in FIG. 2 comprises three relatively long streamers 14 and two relatively short streamers 16 towed behind a survey vessel 2. The long streamers 14 are divided into first and second regions 18 and 20, respectively. The regions 18 and 20 belong to a first array for deep surveying, whereas the regions 20 and the short streamers 16 belong to a second array for shallow surveying, such as site surveying. The first regions 18 have a group interval of, for example, between 12 and 15 meters. The second regions 20 and the short streamers 16 may, for some applications, have the same group spacing as the first regions 18 but, for site surveying normally have a relatively short group interval of, for example, between 6 and 10 meters. The signals received by the regions 20 and the short streamers 16 are processed to provide site survey information. The short streamers 16 are positioned intermediate the regions 20 of the long streamers 14 thereby reducing the cross-line separation of the streamers participating in the site survey compared to the cross-line separation of the streamers 14 participating in the conventional survey.

Data collected by the hydrophones in the second regions 20 of the streamers 14 can be combined with data collected by the hydrophones in the first regions 18 to produce the conventional survey.

The seismic sources used for a conventional deep survey are spread out in an area of typically 20–20 meters. Such an arrangement provides some directivity to the energy and focuses it downwards. The frequency range of such a source can be limited as the energy reflected from several kilometres into the earth is only ever of a low frequency. The peak energy level provided by such sources is high.

The seismic source requirements for site surveys are opposite to those for deep surveys. Low frequency energy is not normally important, whilst significant energy in the range of 50 to 150 Hz is necessary to provide the vertical resolution needed. Furthermore, the towing depth of the source needs to be different since reflection from the water-air interface can interfere destructively with the down going energy. High resolution sources for site surveying are typically towed at depths of less than 4 meters, whereas conventional sources are typically towed at depths of greater than 6 meters.

The conventional source used in a deep survey may be adapted to provide high frequency components. Towing the source at a shallower depth also enhances the high frequency components produced by the source. As noted hereinabove, each source comprises an array of sub-elements. Different sub-elements may be towed at different depths so as to provide both the high frequency components used for site surveying and the low frequency components required for the conventional deep seismic surveying. Alternatively, the sources 6 may include high frequency generating components, within the subarrays.

When separate sources for the deep and shallow surveys are provided, the source providing the shot energy for the shallow survey is fired between the source actuations of the sources for the deep survey. The energy used for the shallow survey is given sufficient time to decay away before the actuation of the sources for the deep survey so as to avoid interference between the surveys.

The time required to record a shallow survey is typically two seconds or less. The length of recording for the deep survey is usually between five and seven seconds with the streamers being digitally sampled every two or four milliseconds. Thus the high resolution source for use with the site survey is fired a couple of seconds before the sources of the deep survey.

Figure 5:
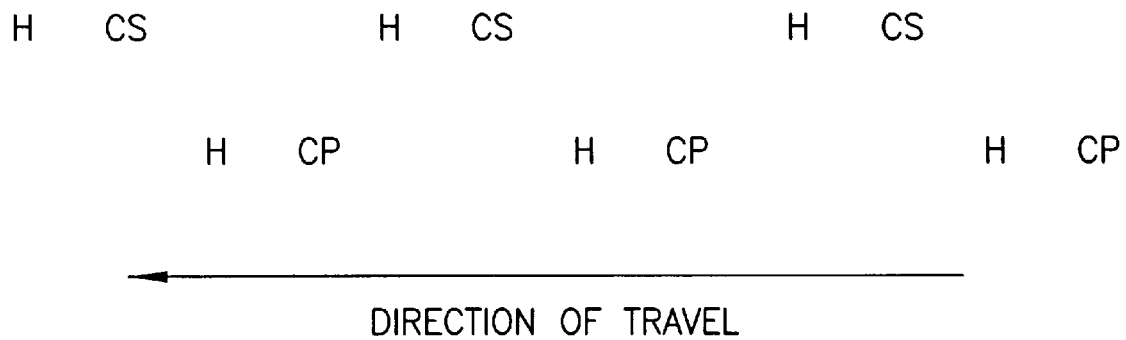
FIG. 5 shows a firing sequence of the first and second embodiments.

In the arrangement shown in FIG. 2, the high resolution sources are attached to the port and starboard conventional sources 6. The firing pattern of the sources for such an arrangement is shown in FIG. 5. H represents the firing of the high resolution source, whereas CS and CP represent the firings of the conventional starboard and port sources, respectively.

Figure 3:
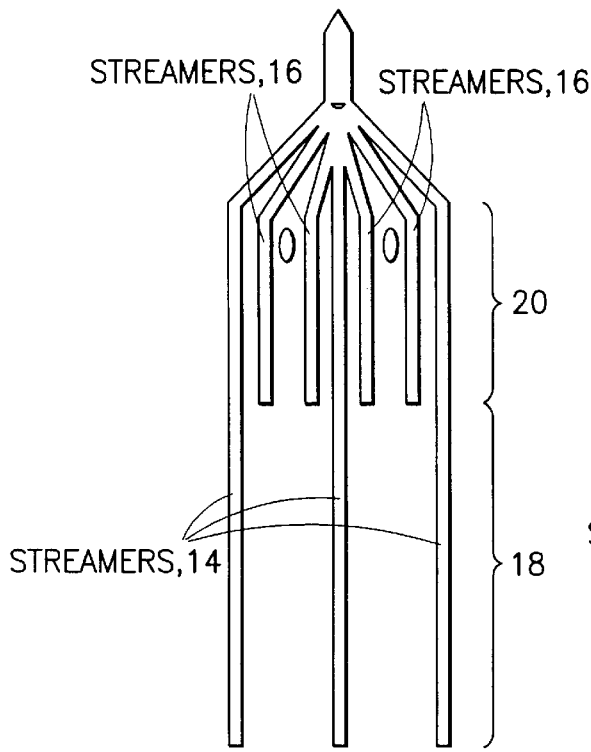
FIG. 3 is a schematic diagram of a survey arrangement constituting a second embodiment of the present invention.

The embodiment shown in FIG. 3 is a variation of the embodiment shown in FIG. 2. Additional short streamers 16 are provided intermediate the long streamers 14 so as to further increase the resolution of the shallow survey.

Figure 4:
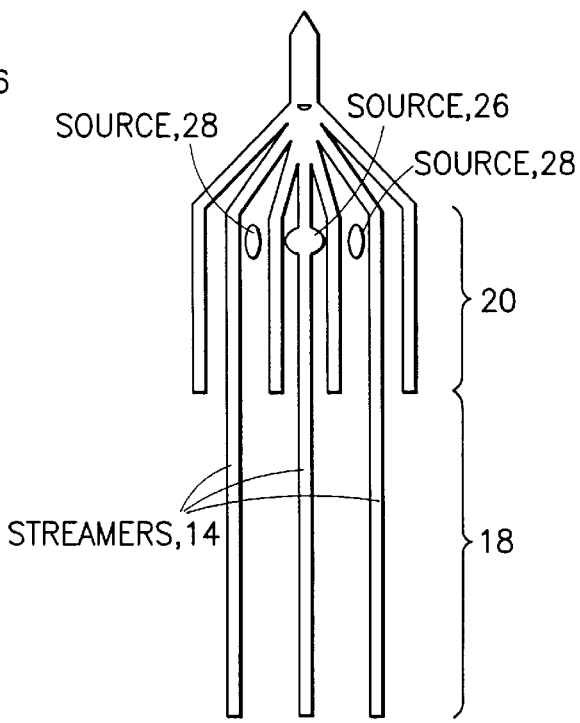
FIG. 4 is a schematic diagram of a survey arrangement constituting a third embodiment of the present invention.
Figure 6:
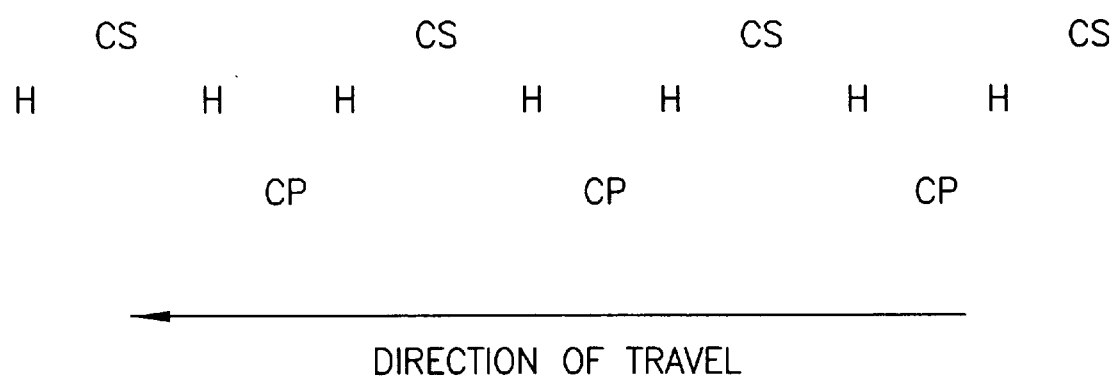
FIG. 6 shows a firing sequence of the third embodiment.

The embodiment shown in FIG. 4 has a centrally disposed high resolution source 26 separate from the port and starboard conventional sources 28. The firing pattern for such an arrangement is illustrated in FIG. 6. The terms H, CS and CP are as defined hereinabove.

Following or during collection of the seismic survey data, seismic processing of the conventional and site surveys can proceed. The bin sizes used for the site survey can be smaller than those used for the deep survey given that the resolution available from the site survey array is better than that from the deep survey array. The site survey and deep survey data may be merged during the processing so as to give enhanced data quality for shallow formations.

The sample rates used for the site survey and the deep survey may differ since the reflected energy in a site survey may have a higher cutoff frequency. If recording equipment is shared by the first and second arrays, the equipment may require the ability to change the effective group interval between shots, to record different shots for different durations, to change sample rates and to send different data to different recording devices.

The control system for the sources may also require the ability to fire different sources or different elements (airguns and/or sparkers) at different times and/or with different peak powers.

The collection of the site survey data at the same time as the conventional survey data removes the need to perform a separate site survey and also ensures that adequate site survey coverage is always available in respect of an area which has been subjected to the conventional survey.

We claim:

1. A method of marine seismic surveying, comprising towing two or more relatively long streamers, said relatively long streamers having first regions for deep seismic surveying, and second regions for shallow seismic surveying, towing one or more relatively short streamers between said relatively long streamers for shallow seimic surveying, and performing deep three dimensional seismic surveying, using said first regions of said relatively long streamers, and shallow three dimensional seismic surveying, using said second regions of said relatively long streamers and said relatively short streamers, concurrently, and in which a bin size for data collected from said second regions of said relatively long streamers and said relatively short streamers is smaller than a bin size for data collected from said first regions of said relatively long streamers.

2. A method as claimed in claim 1, which said first regions of said relatively long streamers have a first group interval, said second regions of said relatively long streamers have a second group interval, and said relatively short streamers have a group interval equal to said second group interval.

3. A method as claimed in claim 2, in which said second group interval is smaller than said first group interval.

4. A method as claimed in claim 1, which a first seismic source is used in conjunction with said first regions of said relatively long streamers and a second seismic source is used in conjunction with said second regions of said relatively long streamers and said relatively short streamers.

5. A method as claimed in claim 4, in which said second seismic source produces a signal having a higher cut-off frequency than said first seismic source.

6. A method as claimed in claim 1, in which at least one seismic source is used in conjunction with said first regions and said second regions of said relatively long streamers and said relatively short streamers.

7. A method as claimed in claim 1, in which said relatively long streamers and said relatively short streamers are towed behind a survey vessel and in which said first regions of said relatively long streamers and said relatively short streamers are positioned substantially equidistantly behind said survey vessel.

8. A method as claimed in claim 1, in which additional such relatively short streamers are positioned outside said relatively long streamers.

9. A method as claimed in claim 1, wherein two or more relatively short streamers are towed and in which said relatively long streamers have a first lateral separation, said relatively short streamers have a second lateral separation, and said first lateral separation is an integer multiple of said second lateral separation.

10. An apparatus for marine seismic surveying, comprising two or more relatively long streamers, said relatively long streamers having first regions for deep seismic surveying and second regions for shallow seismic surveying, and one or more relatively short streamers between said relatively long streamers for shallow seismic surveying, said relatively long streamers and said relatively short streamers being arranged to perform deep three dimensional seismic surveying, using said first regions of said relatively long streamers, and shallow three dimensional seismic surveying, using said second regions of said relatively long streamers and said relatively short streamers, concurrently, and which a bin size for data collected from said second regions of said relatively long streamers and said relatively short streamers is smaller than a bin size for data collected from said first regions of said relatively long streamers.

11. An apparatus as claimed in claim 10, in which said first regions of said relatively long streamers have a first group interval, said second regions of said relatively long streamers have a second group interval, and said relatively short streamers have a group interval equal to said second group interval.

12. An apparatus as claimed in claim 11, in which said second group interval is smaller than said first group interval.

13. An apparatus as claimed in claim 10, further including a first seismic source to be used in conjunction with said first regions of said relatively long streamers and a second seismic source to be used in conjunction with said second regions of said relatively long streamers and said relatively short streamers.

14. An apparatus as claimed in claim 13, in which said second seismic source produces a signal having a higher cut-off frequency than said first seismic source.

15. An apparatus as claimed in claim 10, further including at least one seismic source to be used in conjunction with said first regions and said second regions of said relatively long streamers and said relatively short streamers.

16. An apparatus as claimed in claim 10, in which said relatively long streamers and said relatively short streamers are towed behind a survey vessel and in which said first regions of said relatively long streamers and said relatively short streamers are positioned substantially equidistantly behind said survey vessel.

17. An apparatus as claimed in claim 10, in which additional such relatively short streamers are positioned outside said relatively long streamers.

18. An apparatus as claimed in claim 10, wherein there are two or more relatively short streamers and in which said relatively long streamers have a first lateral separation, said relatively short streamers have a second lateral separation, and said first lateral separation is an integer multiple of said second lateral separation.

19. A method of marine seismic surveying as claimed in claim 1, in which:

two or more relatively short streamers are towed, said first regions of said relatively long streamers have a first group interval, said second regions of said relatively long streamers have a second group interval, said relatively short streamers have a group interval equal to said second group interval, said second group interval is smaller than said first group interval, said relatively long streamers and said relatively short streamers are towed behind a survey vessel, said first regions of said relatively long streamers and said relatively short streamers are positioned substantially equidistantly behind said survey vessel, said relatively long streamers have a first lateral separation, said relatively short streamers have a second lateral separation, and said first lateral separation is an integer multiple of said second lateral separation.

20. An apparatus as claimed in claim 10, in which:

there are two or more relatively short streamers, said first regions of said relatively long streamers have a first group interval, said second regions of said relatively long streamers have a second group interval, said relatively short streamers have a group interval equal to said second group interval, said second group interval is smaller than said first group interval, said relatively long streamers and said relatively short streamers are towed behind a survey vessel, said first regions of said relatively long streamers and said relatively short streamers are positioned substantially equidistantly behind said survey vessel, said relatively long streamers have a first lateral separation, said relatively short streamers have a second lateral separation, and said first lateral separation is an integer multiple of said second lateral separation.

\* \* \* \* \*